United States Patent [19]

Yang

[11] Patent Number: 4,789,128
[45] Date of Patent: Dec. 6, 1988

[54] DETACHABLE FAN BASE

[76] Inventor: Pay J. Yang, 9-11, Hai Wai Lane, Chung Yang Rd., Chung Ho Village, Lung Ching Hsiang, Taichung District, Taiwan

[21] Appl. No.: 920,745
[22] Filed: Oct. 20, 1986
[51] Int. Cl.$^4$ .............................................. F16M 11/00
[52] U.S. Cl. ................................... 248/676; 248/165; 248/222.1
[58] Field of Search .................. 248/676, 158, 188.1, 248/127, 159, 681, 678, 679, 677, 675, 222.1, 187, 177; 417/360

[56] References Cited

U.S. PATENT DOCUMENTS

| | | | |
|---|---|---|---|
| 2,280,090 | 4/1942 | Humphreys | 248/676 X |
| 2,615,664 | 10/1952 | Reeves | 248/177 |
| 4,180,376 | 12/1979 | Iwaki et al. | 248/678 X |
| 4,457,672 | 7/1984 | Ogura et al. | 417/360 |
| 4,525,052 | 6/1985 | Kosugi et al. | 248/187 X |
| 4,570,887 | 2/1986 | Banister | 248/187 |
| 4,577,828 | 3/1986 | Drucker et al. | 248/678 |

FOREIGN PATENT DOCUMENTS

| | | | |
|---|---|---|---|
| 521311 | 3/1955 | Italy | 248/678 |
| 1202574 | 8/1970 | United Kingdom | 248/222.1 |

Primary Examiner—Ramon S. Britts
Assistant Examiner—Karen J. Chotkowski
Attorney, Agent, or Firm—Steinberg & Raskin

[57] ABSTRACT

A fan base comprising an inner base and an outer detachable base, the inner base of which is slideably engageable into the track of the outer detachable base. The inner base has engagement rails on either side thereof which slide into and engage with engagement slots in the ends of the detachable base. The detachable base also has a retainer, which is a piece separated from, and slightly inclined with respect to, the track of the detachable base. This retainer holds the wall of the inner base until the user pulls down on a release latch thereof so as to disengage the two bases from each other.

12 Claims, 3 Drawing Sheets

DETACHABLE FAN BASE

BACKGROUND OF THE INVENTION

This invention relates to a fan base which has a detachable portion so as to be easier to disassemble and store. Previously, fans were difficult to pack up and store for moving or cold weather because the shape of the fan was so awkward. The two largest portions, the base and the fan portions, were perpendicular to each other. This also presented a problem with respect to packaging and shipping the fan in the first place, since the more space the fan takes up, the more expensive it is to ship and the larger the corresponding package that is needed.

It is the purpose of this present invention, therefore, to mitigate and/or obviate the abovementioned drawbacks in the manner set forth in the detailed description of the preferred embodiment.

SUMMARY OF THE INVENTION

A primary objective of this invention is to provide a detachable fan base which allows for easy assembly, and disassembly, of the base of the fan.

Another objective of this invention is to provide a detachable fan base which is inexpensive to manufacture.

A further objective of this invention is to provide a detachable fan base which can be stored in a smaller and more regular space than was previously possible.

Further objectives and advantages of the present invention will become apparent as the following description proceeds, and the features which characterize the invention are pointed out with particularity below.

DETAILED DESCRIPTION OF THE PREFERRED EMBODIMENT

Figure 1:
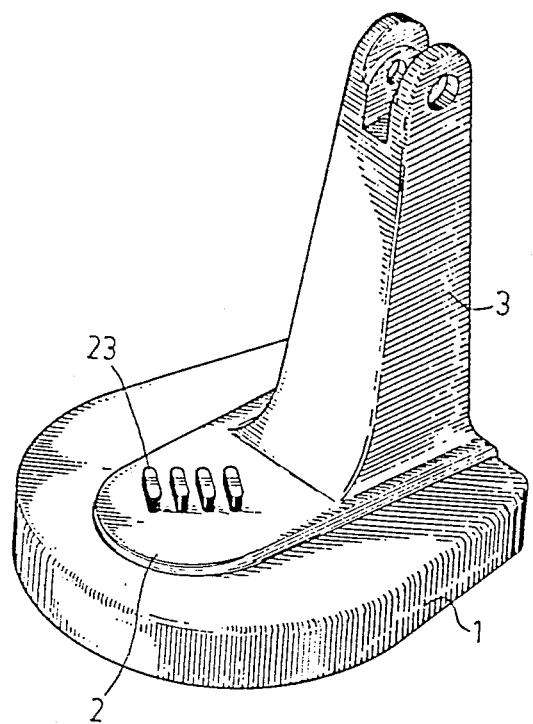
FIG. 1 is a perspective view of the present invention.

Referring to FIG. 1, it can be seen that the present invention comprises a detachable base 1 and an inner base 2 which forms one piece with the support arm 3 of a fan (motor and blade not shown). The inner base 2 also comprises speed control buttons 23, which are shown for reference purposes only.

Figure 2:
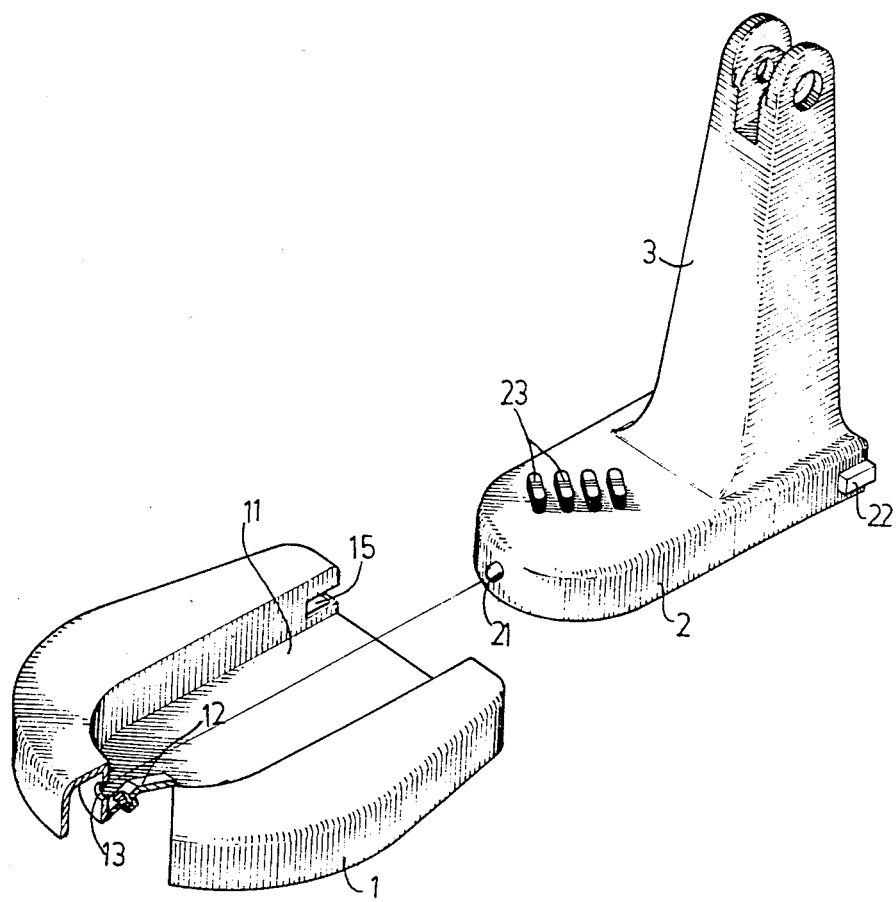
FIG. 2 is an exploded view of the present invention.

From FIGS. 1 and 2, it can be understood how the inner base 2 and the detachable base 1 engage. The inner base 2, fits slideably into the recessed track 11, so that only the top and the front of the inner base 2 are exposed when the two bases, 1 and 2, are fully engaged.

Figure 3:
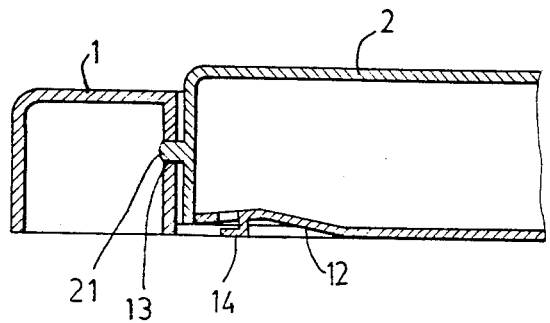
FIG. 3 is a partial cross-sectional view of the two base portions of the present invention, shown in engaged position.

Two engagement rails 22, one on either side of the inner base 2, are set on the support arm 3 end of the inner base 2 in order to secure the inner base 2 so that is cannot move vertically. These engagement rails 22 slide into respective engagement slots 15. Therefore the inner base 2 cannot be pulled up off the detachable base 1 or become easily detached if, for instance, the fan is accidentally knocked over. On the innermost part of the track (i.e. the bottom of the U-shaped track) is a retainer 12. This retainer 12 is slightly inclined so that the end thereof is at a position slightly higher than the floor of the track 11. Thus, when the inner base 2 is to be engaged with the detachable base 1, then the inner base 2 is slid horizontally along the track 11 until the front end thereof (i.e. the end with the securing knob 21) contacts the retainer 12. Since the retainer 12 is made of a flexible material (same material as rest of detachable base 1), it bends down slightly to accommodate the front wall of the inner base 2. When the wall of the inner base 2 completely passes over the retainer 12, the retainer 12 returns to its normal position, as shown in FIG. 3. In this position, the retainer 12 prevents the inner base 2 from sliding horizontally.

Still referring to FIG. 3, it can be seen that the inner base will remain in this position until the release latch 14 is pulled down so as to allow the inner base 2 to be released. Also note that, when the inner base 2 is being engaged that, the securing knob 21, which is aligned with the centerline of the inner base 2, fits through the securement hole 13 for added security and stability of engagement between the two bases, 1 and 2.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

What is claimed is:

1. A detachable fan base, comprising:
    an inner base and an outer base formed to be engagable with one another,
    said inner base comprising
    (1) two engagement rails formed on opposite lateral sides thereof,
    (2) a support arm for a fan integrally formed with said inner base, and
    (3) a securing knob aligned with a longitudinally-extending center line of said inner base,
    and said outer base comprising
    (A) a recessed track arranged thereon for slidably receiving said inner base therein when said bases are engaged.
    (B) a pair of engagement slots situated thereon to slidably receive said respective rails of said inner base when the same is slidably received into said recessed track of said outer base and restricting vertical movement of said inner base with respect to said outer base,
    (C) a securing hole aligned thereon to receive said securing knob of said inner base when the same is slidably received in said recessed track of said outer base, so as to further secure and stabilize said inner base with respect to said outer base,
    (D) a retainer for preventing said inner base from sliding horizontally when engaged with said outer base, and
    (E) a release latch situated on said retainer and which can be actuated so as to allow said inner base to be disengaged from said outer base.

2. The base of claim 1, wherein said slots are situated on vertically-extending walls around said recessed track at a rear end of said outer base, and open to the rear, to thereby receive said respective rails of said inner base, also situated on vertically-extending portions of the same.

3. The base of claim 1, wherein said securing knob is situated on a forward end of said inner base, and said securing hole is situated on a vertically extending wall of said outer base at a forward end of said recessed track.

4. The base of claim 1, wherein said retainer is formed on a bottom of said recessed track, is slightly inclined with a protruding end thereof normally extending to a level slightly higher than the bottom of said recessed track, and is made of flexible material so that said retainer bends down slightly to accommodate a front wall of said inner base when the same is slid into said recessed track.

5. The base of claim 4, wherein said latch is positioned underneath said retainer so that said latch is pulled downwardly to allow said inner base to be disengaged from said outer base.

6. The base of claim 4, wherein said protruding end of said retainer extends, in normal position, to a level higher than a lower end of a front wall of said inner base situated between said retainer and a forward end of said recessed track when said inner base is received in said outer base, said retainer thereby preventing said inner base from sliding rearwardly out from said outer base.

7. The base of claim 4, wherein said retainer is integrally formed with said outer base at the bottom of said recessed track.

8. The base of claim 7, wherein said latch is integrally formed with said retainer.

9. The base of claim 2, wherein said walls are substantially parallel, and said portions are substantially parallel.

10. The base of claim 1, wherein said support arm additionally comprises
   means for mounting a fan thereon at an end opposite said inner base.

11. The base of claim 2, wherein said rails are situated on an end of said inner base adjacent said support arm and remote from said securing knob.

12. The base of claim 10, additionally comprisng
   a fan mounted on said mounting means.

* * * * *